(12) United States Patent
Cullen et al.

(10) Patent No.: US 11,181,426 B1
(45) Date of Patent: Nov. 23, 2021

(54) BIAS CURRENT VARIATION CORRECTION FOR COMPLEMENTARY METAL-OXIDE-SEMICONDUCTOR (CMOS) TEMPERATURE SENSOR

(71) Applicant: Xilinx, Inc., San Jose, CA (US)

(72) Inventors: Edward Cullen, Naas (IE); Umanath R. Kamath, Dublin (IE); John K. Jennings, Glenageary (IE); Diarmuid Collins, Dunshaughlin (IE); Ionut C. Cical, Saggart (IE)

(73) Assignee: Xilinx, Inc., San Jose, CA (US)

( * ) Notice: Subject to any disclaimer, the term of this patent is extended or adjusted under 35 U.S.C. 154(b) by 453 days.

(21) Appl. No.: 16/268,124

(22) Filed: Feb. 5, 2019

(51) Int. Cl.
    *G01K 7/00*     (2006.01)
    *G01K 15/00*     (2006.01)
    *G01K 7/01*     (2006.01)
    *G01K 1/00*     (2006.01)

(52) U.S. Cl.
    CPC ............ *G01K 7/01* (2013.01); *G01K 1/00* (2013.01)

(58) Field of Classification Search
    USPC .................. 374/1, 178, 163, 166
    See application file for complete search history.

(56) References Cited

U.S. PATENT DOCUMENTS

| | | | |
|---|---|---|---|
| 6,674,185 B2 * | 1/2004 | Mizuta | G01K 15/00 307/651 |
| 10,345,158 B2 * | 7/2019 | Selgi | G01K 7/01 |
| 2014/0086277 A1 * | 3/2014 | Sanchez | G01K 1/026 374/178 |
| 2014/0086279 A1 * | 3/2014 | Cao | G01K 7/01 374/183 |
| 2018/0100774 A1 * | 4/2018 | Singh | G01K 15/005 |

* cited by examiner

*Primary Examiner* — Mirellys Jagan
(74) *Attorney, Agent, or Firm* — Paradice and Li LLP

(57) ABSTRACT

A temperature sensor includes a current source to produce a first bias current and a second bias current, a plurality of diodes, and temperature estimation circuitry. The plurality of diodes includes at least a first diode to receive the first bias current and a second diode to receive the second bias current. The temperature estimate circuitry measures a first voltage bias across the first diode resulting from the first bias current and a second voltage bias across the second diode resulting from the second bias current, and estimates a temperature of an environment of the temperature sensor based at least in part on the first voltage bias and the second voltage bias. The temperature sensor further includes error detection circuitry to measure at least one of the first or second bias currents and determine an amount of error in the temperature estimate based at least in part on the measurement.

20 Claims, 7 Drawing Sheets

US 11,181,426 B1

BIAS CURRENT VARIATION CORRECTION FOR COMPLEMENTARY METAL-OXIDE-SEMICONDUCTOR (CMOS) TEMPERATURE SENSOR

TECHNICAL FIELD

Aspects of the present disclosure generally relate to integrated circuits, and specifically to a system and method for correcting bias current variation in complementary metal-oxide semiconductor (CMOS) temperature sensors.

BACKGROUND

Complementary metal-oxide semiconductor (CMOS) temperature sensors are often used in distributed temperature monitoring across integrated circuit devices. A conventional CMOS temperature sensor includes a pair of bipolar junction transistors (BJTs) which can be identical (1:1) or of a fixed ratio (1:N). The difference between the base-emitter voltages ($V_{be}$) of the BJTs is proportional to the absolute temperature of the environment (e.g., silicon) in which the temperature sensor operates. The voltage difference ($\Delta V_{be}$) is amplified and converted to a digital temperature value by an analog-to-digital converter (ADC). For example, the ADC may compare the temperature-dependent voltage difference $\Delta V_{be}$ with a temperature-independent reference voltage to perform the digital conversion.

The voltage difference $\Delta V_{be}$ is often amplified before being converted to the digital domain because the $\Delta V_{be}$ used in BJT-based temperature sensors tends to have a relatively low inherent temperature coefficient. However, this also causes BJT-based temperature sensors to be more susceptible to errors due spread in the voltage difference $\Delta V_{be}$. Since the voltage difference $\Delta V_{be}$ is directly converted to a corresponding temperature measurement in the digital backend (e.g., using a single equation), any process spread that affects $\Delta V_{be}$ may result in additional error in the measured temperature. Thus, it may be desirable to reduce or compensate for the spread in $\Delta V_{be}$ when using BJTs in a CMOS temperature sensor.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to complementary metal-oxide semiconductor (CMOS) temperature sensors and methods of their operation. An example temperature sensor includes a current source to produce a first bias current and a second bias current, a plurality of diodes, and temperature estimation circuitry. The plurality of diodes includes at least a first diode to receive the first bias current and a second diode to receive the second bias current. The temperature estimate circuitry measures a first voltage bias across the first diode resulting from the first bias current and a second voltage bias across the second diode resulting from the second bias current, and estimates a temperature of an environment of the temperature sensor based at least in part on the first voltage bias and the second voltage bias. The temperature sensor further includes error detection circuitry, switchably coupled to the current source, to measure at least one of the first or second bias currents and determine an amount of error in the temperature estimate based at least in part on the measurement.

In some embodiments, the error detection circuitry is configured to measure at least one of the first or second bias currents when the temperature estimation circuitry is in a sleep state. The error detection circuitry may determine the amount of error in the temperature estimate based at least in part on variations in at least one of the first or second bias currents. The error detection circuitry may comprise a resistor, switching circuitry to route each of the first and second bias currents to the resistor, and error calculation circuitry to determine the amount of error in the temperature estimate based at least in part on a voltage of the resistor resulting from the first and second bias currents.

In some embodiments, the switching circuitry may route the first and second bias currents, concurrently, to the resistor. In some other embodiments, the switching circuitry may route each of the first and second bias currents to the resistor at different times. For example, the error calculation circuitry may measure a first voltage across the resistor in response to the first bias current and a second voltage across the resistor in response to the second bias current. In some aspects, the error calculation circuitry may determine the amount of error in the temperature estimate based on a difference between the first voltage and the second voltage. In some other aspects, the error calculation circuitry may determine the amount of error in the temperature estimate based on a sum of the first voltage and the second voltage.

In some embodiments, the temperature sensor may further comprise error compensation circuitry to adjust the temperature estimate based at least in part on the amount of error. In some aspects, the error compensation circuitry may adjust the temperature estimate by adjusting at least one of the first bias current or the second bias current produced by the current source. In some other aspects, the error compensation circuitry may adjust the temperature estimate by adjusting at least one of the first voltage bias or the second voltage bias of the plurality of diodes.

An example method disclosed herein may be used to operate a temperature sensor. The method may include generating a first bias current and a second bias current; measuring a first voltage bias across a first diode coupled to receive the first bias current; measuring a second voltage bias across a second diode coupled to receive the second bias current; estimating a temperature of an environment of the temperature sensor based at least in part on the first voltage bias and the second voltage bias; measuring at least one of the first or second bias currents; and determining an amount of error in the temperature estimate based at least in part on the measurement.

In some embodiments, the step of measuring at least one of the first or second bias currents may include a step of measuring the at least one of the first or second bias currents when the temperature sensor is not estimating the temperature of the environment. The amount of error in the temperature estimate may be determined based at least in part on variations in at least one of the first or second bias currents. In some embodiments, the step of measuring at least one of the first or second bias currents may include steps of routing each of the first and second bias currents to a resistor; and measuring a voltage of the resistor resulting from the first and second bias currents, wherein the amount of error in the temperature estimate is determined based at least in part on the voltage of the resistor.

In some embodiments, the first and second bias currents may be concurrently routed to the resistor. In some other embodiments, the first and second bias currents may be routed to the resistor at different times. In some aspects, the step of measuring at least one of the first or second bias currents includes steps of measuring a first voltage across the resistor in response to the first bias current; and measuring a second voltage across the resistor in response to the second bias current.

In some embodiments, the method may further comprise a step of adjusting the temperature estimate based at least in part on the amount of error. In some aspects, the step of adjusting the temperature estimate may include a step of adjusting at least one of the first bias current or the second bias current. In some other aspects, the step of adjusting the temperature estimate may include a step of adjusting at least one of the first voltage bias or the second voltage bias.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1:
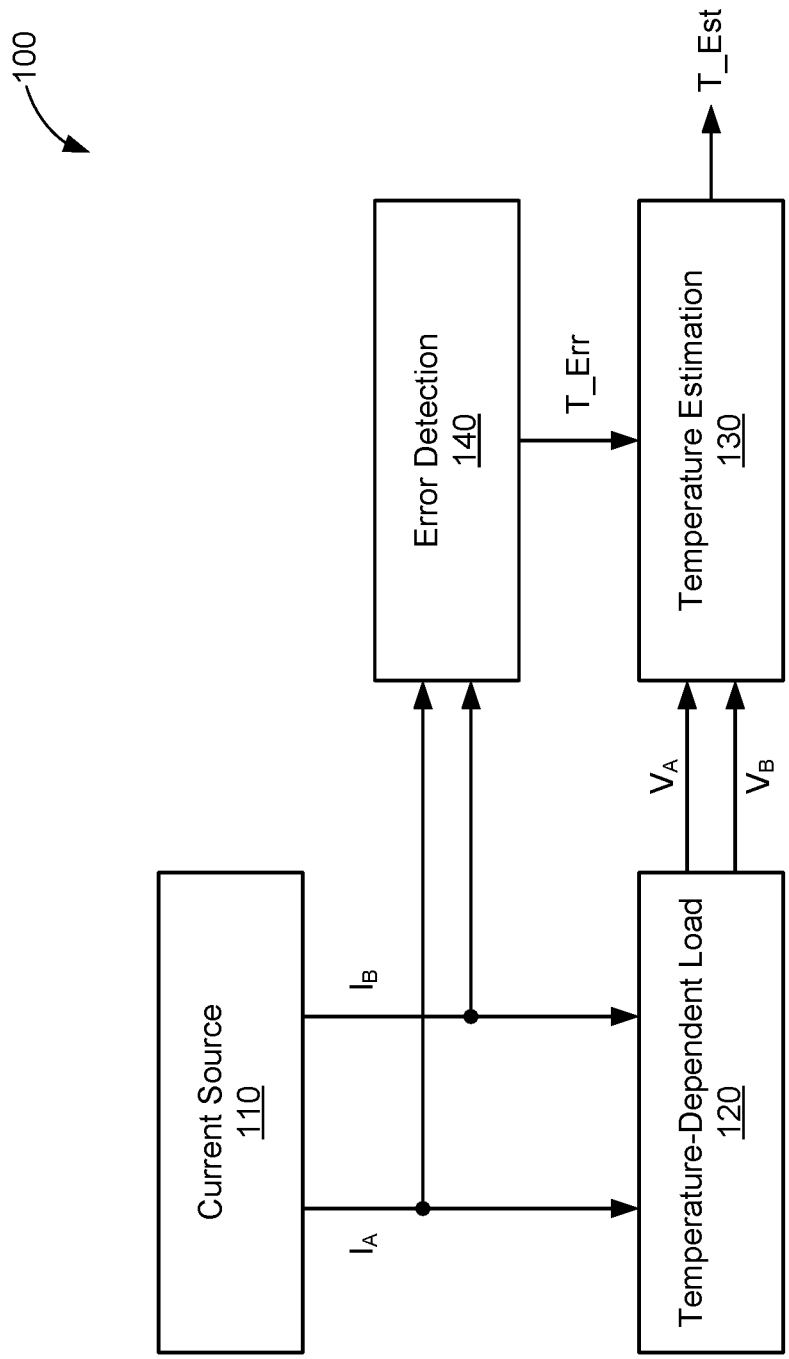
FIG. 1 is a block diagram of a temperature sensor, in accordance with some embodiments.

FIG. 1 is a block diagram of a temperature sensor 100, in accordance with some embodiments. The temperature sensor 100 may be used for distributed temperature monitoring across integrated circuit devices such as, for example, Field Programmable Gate Arrays (FPGA) or System-on-a-Chip (SoC) devices. The temperature sensor 100 includes a current source 110, a temperature-dependent load 120, temperature estimation circuitry 130, and error detection circuitry 140.

The current source 110 produces a plurality of bias currents $I_A$ and $I_B$. In the example of FIG. 1, the current source 110 is shown to produce a pair of bias currents (e.g., $I_A$ and $I_B$). However, in actual implementations, the current source 110 may produce any number of bias currents, including fewer or more bias currents than those depicted in FIG. 1. In some embodiments, the current source 110 may include a current generator (e.g., a bandgap voltage reference) that produces a reference current and a plurality of current mirrors configured to produce the bias currents $I_A$ and $I_B$ by mirroring the reference current.

The temperature-dependent load 120 receives the bias currents $I_A$ and $I_B$ from the current source 110 and produces a plurality of voltage biases $V_A$ and $V_B$ based on the bias currents $I_A$ and $I_B$, respectively. In some embodiments, the voltage biases $V_A$ and $V_B$ across the temperature-dependent load 120 may vary with respect to the temperature of the environment (e.g., silicon) of the temperature sensor 100. For example, in some aspects, the temperature-dependent load 120 may comprise a plurality of diodes (e.g., where the voltage biases $V_A$ and $V_B$ are produced by the flow of the bias currents $I_A$ and $I_B$, respectively, across the P-N junctions of two or more diodes). In some implementations, the diodes may be formed using transistors such as, for example, bipolar junction transistors (BJTs), CMOS transistors, and the like. The P-N junction of a diode (or transistor) is sensitive to temperature. As a result, under steady current, the voltage across the P-N junction tends to vary linearly with respect to temperature.

It is noted that the temperature-dependent load 120 may be sensitive to process variations. More specifically, due to process variations, different diodes (or transistors) may produce different voltage biases $V_A$ and/or $V_B$ under the same (or similar) temperature conditions. However, the effects of such process variations can be substantially reduced or mitigated by comparing the voltage biases $V_A$ and $V_B$ across two or more diodes that are manufactured together using the same process. In some embodiments, the temperature-dependent load 120 may be configured to produce different voltages $V_A$ and $V_B$ in response to respective bias currents $I_A$ and $I_B$. For example, the diodes coupled to the first bias current $I_A$ may be proportional to the diodes coupled to the second bias current $I_B$ by a ratio (1:N) such that the resulting voltages $V_A$ and $V_B$ are substantially different (e.g., $|V_A-V_B|>0$).

The temperature estimation circuitry 130 measures the voltage biases $V_A$ and $V_B$ across the temperature-dependent load 120 and calculates a temperature estimate (T_Est) based, at least in part, on the measured voltages $V_A$ and $V_B$. In some implementations, the temperature estimation circuitry 130 may calculate the temperature estimate T_Est based on the difference between the first voltage bias $V_A$ and the second voltage bias $V_B$. As described above, the difference between the voltages $V_A$ and $V_B$ may vary linearly with respect to temperature. In generating the temperature estimate T_Est, the temperature estimation circuitry 130 may convert the voltage difference to a digital value that more closely reflects the actual temperature of the environment.

Aspects of the present disclosure recognize that, due to process variations, the current source 110 may produce varying amounts of bias currents $I_A$ and $I_B$, which may create a spread between the voltages $V_A$ and $V_B$. The voltage spread may result in errors or inaccuracies in the temperature estimate T_Est. Thus, in some embodiments, the error detection circuitry 140 may be configured to detect variations or errors in the bias currents $I_A$ and $I_B$. More specifically, the error detection circuitry 140 may compare the bias currents $I_A$ and $I_B$ to a nominal or expected value (e.g., for a reference current) to determine the accuracy of the bias currents $I_A$ and $I_B$ (e.g., how accurately the bias currents $I_A$ and $I_B$ mirror the reference current). The error detection circuitry 140 may further determine an error value (T_Err) based, at least in part, on the measured bias currents $I_A$ and $I_B$. The error value T_Err may indicate an amount of error expected in the temperature estimate T_Est given the amount of variation in the bias currents $I_A$ and $I_B$.

In some embodiments, the error value T_Err may be used to adjust the temperature estimate T_Est and/or compensate for the variations in the bias currents $I_A$ and/or $I_B$. For example, in some aspects, the temperature estimation circuitry 130 may use the error value T_Err to adjust or correct the temperature estimate T_Est in the digital domain (e.g., by adding or subtracting the error value T_Err from the temperature estimate T_Est). In some other aspects, the error value T_Err may be provided to current correction circuitry (not shown for simplicity) configured to correct the temperature estimate T_Est (e.g., in the analog domain) by adjusting one or more of the bias currents $I_A$ and/or $I_B$. Still further, in some aspects, the error value T_Err may be provided to voltage correction circuitry (not shown for simplicity) configured to correct the temperature estimate T_Est (e.g., in the analog domain) by adjusting one or more of the voltage biases $V_A$ and/or $V_B$.

Figure 2:
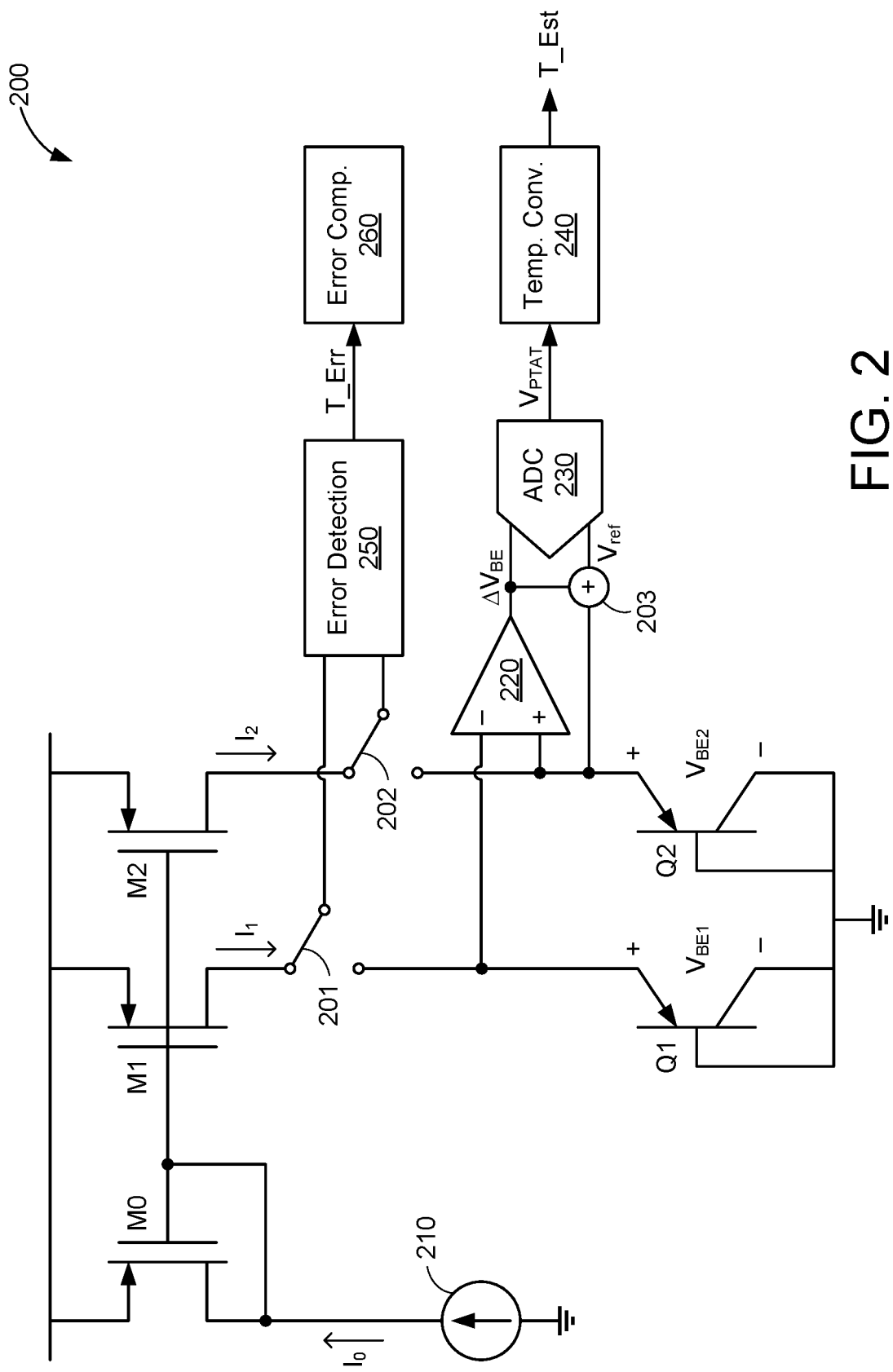
FIG. 2 is a circuit diagram of a temperature sensor, in accordance with some embodiments.

FIG. 2 is a circuit diagram of a temperature sensor 200, in accordance with some embodiments. The temperature sensor 200 may be an example embodiment of the temperature sensor 100 of FIG. 1. Thus, the temperature sensor 200 may be used for distributed temperature monitoring across integrated circuit devices. The temperature sensor 200 includes first transistors M0-M2, second transistors Q1 and Q2, a current source 210, an amplifier 220, an analog-to-digital converter (ADC) 230, a temperature conversion circuit 240, an error detection circuit 250, and an error compensation circuit 260.

The current source 210 is configured to generate a temperature-independent reference current $I_0$. For example, the current source 210 may correspond to or include a bandgap voltage reference. The first transistors M0-M2 are configured to operate as a current mirror to produce a set of bias currents $I_1$ and $I_2$ that are substantially equal to the reference current $I_0$. In the example of FIG. 2, the transistors M0-M2 are depicted as P-type metal-oxide semiconductor field-effect (MOSFET) transistors. However, in actual implementations, one or more of the transistors M0-M2 may be implemented using a different transistor type (e.g., BJT) or a different channel type (e.g., NMOS).

In some embodiments, the dimensions and/or properties of the transistors M1 and M2 are configured to be substantially similar (if not identical). For example, the transistors M1 and M2 may be manufactured to the same specification using the same process. Thus, the magnitude of each of the bias currents $I_1$ and $I_2$ should be substantially equal to a nominal current value (such as $I_0$) when the transistors M1 and M2 are coupled to the same or equivalent loads. However, due to process variations, the bias currents $I_1$ and $I_2$ may differ from the nominal value.

The second transistors Q1 and Q2 are configured to receive the bias currents $I_1$ and $I_2$, respectively. In the example of FIG. 2, the transistors Q1 and Q2 are depicted as PNP transistors. However, in actual implementations, one or more of the transistors Q1 and/or Q2 may be implemented using a different transistor type (e.g., MOSFET) or a different BJT type (e.g., NPN). As shown in FIG. 2, the base and collector terminals of each of the transistors Q1 and Q2 are shorted to ground. The emitter terminal of transistor Q1 is configured to receive the first bias current $I_1$ and the emitter terminal of transistor Q2 is configured to receive the second bias current $I_2$. In this configuration, the transistors Q1 and Q2 may function as diodes (e.g., based on the P-N junction between the base and emitter of each of the transistors Q1 and Q2). In some embodiments, the dimensions and/or properties of the transistors Q1 and Q2 may have a ratio (1:N). Accordingly, the net collector current of transistor Q2 is expected to be N times the collector current of transistor Q1 (e.g., $I_2=N*I_1$).

The voltages between the base and emitter terminals ($V_{BE}$) of the transistors Q1 and Q2 can be expressed as a function of the bias currents $I_1$ and $I_2$:

$$V_{BE1} = \frac{kT}{q}\ln\frac{I_1}{I_S}$$

$$V_{BE2} = \frac{kT}{q}\ln\frac{I_2}{I_S}$$

where $V_{BE1}$ and $V_{BE2}$ are the base-emitter voltages of the transistors Q1 and Q2, respectively, k is the Boltzmann constant, T is the absolute temperature, q is the electron charge, and $I_S$ the saturation current. It is noted that the saturation current $I_S$ may be process-dependent. However, by taking the difference between the base-emitter voltages, the effects of the saturation current $I_S$ may cancel out:

$$\Delta V_{BE} = V_{BE2} - V_{BE1} = \frac{kT}{q}\ln\frac{I_2}{I_1} \qquad (1)$$

Thus, the difference between the base-emitter voltages ($\Delta V_{BE}$) of the transistors Q1 and Q2 may be proportional to the absolute temperature of the environment.

The amplifier 220 amplifies the difference between base emitter voltages $V_{BE1}$ and $V_{BE2}$ of the transistors Q1 and Q2, respectively, and the resulting voltage difference ($\Delta V_{BE}$) is sampled by the ADC 230. More specifically, the ADC 230 may generate a digital voltage sample that is proportional to absolute temperature ($V_{PTAT}$) by comparing the voltage difference $\Delta V_{BE}$ to a reference voltage ($V_{ref}$). In some aspects, a temperature-independent reference voltage $V_{ref}$ can be produced based on a combination of the voltage difference $\Delta V_{BE}$ and the base-emitter voltage ($V_{BE}$) of one of the transistors Q1 or Q2. For example, an adder circuit 203 may apply a scaling factor ($\alpha$) to the voltage difference $\Delta V_{BE}$ and add the base-emitter voltage $V_{BE2}$ to produce the reference voltage $V_{ref}$:

$$V_{ref}=V_{BE2}+\alpha\Delta V_{BE}$$

The temperature conversion circuit 240 may convert the digital voltage $V_{PTAT}$ to a temperature estimate (T_Est) that more closely reflects the actual temperature of the environment. For example, the temperature conversion circuit 240 may apply a scaling factor to the digital voltage $V_{PTAT}$ to produce a temperature estimate T_Est within a preconfigured temperature range.

It is noted that BJTs (e.g., transistors Q1 and Q2) tend to have a very low temperature coefficient. As a result, the temperature estimate T_Est may be susceptible to error due to the spread in the voltage difference $\Delta V_{BE}$. Further, process variations (e.g., in the manufacture of the BJTs) may also contribute to the spread in the voltage difference $\Delta V_{BE}$. Since the temperature conversion circuit 240 converts the digital voltage $V_{PTAT}$ directly to the temperature estimate T_Est (e.g., using a single equation), any process spread in the voltage difference $\Delta V_{BE}$ may result in additional error the resulting temperature estimate T_Est. As described above, process variations may result in variations in the bias currents $I_1$ and $I_2$, which may further contribute to the spread in the voltage difference $\Delta V_{BE}$.

In some embodiments, the error detection circuit 250 may be switchably coupled to the transistors M1 and M2 (e.g., via switches 201 and 202, respectively) to detect variations or differences in the bias currents $I_1$ and $I_2$. In some aspects, the error detection circuit 250 may be coupled to receive the bias currents $I_1$ and/or $I_2$ during a period when the temperature sensor 200 is in a sleep state (e.g., where the temperature sensor 200 is not actively generating a temperature estimate T_Est). For example, during the sleep state, the switches 201 and 202 may couple the error detection circuit 250 to the first transistors M1 and M2 while also decoupling the second transistors Q1 and Q2 from the first transistors M1 and M2.

The error detection circuit 250 may compare the bias currents $I_1$ and $I_2$ to a nominal current value. As described above, the transistors M1 and M2 are configured to mirror the reference current $I_0$. Thus, each of the bias currents $I_1$ and $I_2$ should ideally be equal to the same nominal current value when measured across the same load. Differences in the bias currents $I_1$ and $I_2$ (e.g., when the second transistors Q1 and Q2 are decoupled from the first transistors M1 and M2) may be attributed to process variations in the manufacture of the first transistors M1 and M2. With reference for example to Equation 1, it is noted that the voltage difference $\Delta V_{BE}$ may vary with respect to variations in the bias currents $I_1$ and/or $I_2$. It is also noted that any variations in the voltage difference $\Delta V_{BE}$ may be directly converted to errors in the temperature estimate T_Est (e.g., by the temperature conversion circuit 240). Accordingly, the error detection circuit 250 may calculate an amount of error (T_Err) in the temperature estimate T_Est based on variations in one or more of the bias currents $I_1$ and/or $I_2$.

In some embodiments, the error T_Err may be provided to the error compensation circuit 260 to reduce or otherwise compensate for the error in the temperature estimate T_Est. In some aspects, the error compensation circuit 260 may correct the temperature estimate T_Est in the digital domain. For example, the error compensation circuit 260 may subtract (or add) the error T_Err from the temperature estimate T_Est. In some other aspects, the error compensation circuit 260 may adjust one or more of the bias currents $I_1$ and/or $I_2$ to reduce the error in the temperature estimate T_Est (e.g., in the analog domain). Still further, in some aspects, the error compensation circuit 260 may adjust one or more of the base-emitter voltage $V_{BE1}$ and/or $V_{BE2}$ to reduce the error in the temperature estimate T_Est (e.g., in the analog domain).

Figure 3:
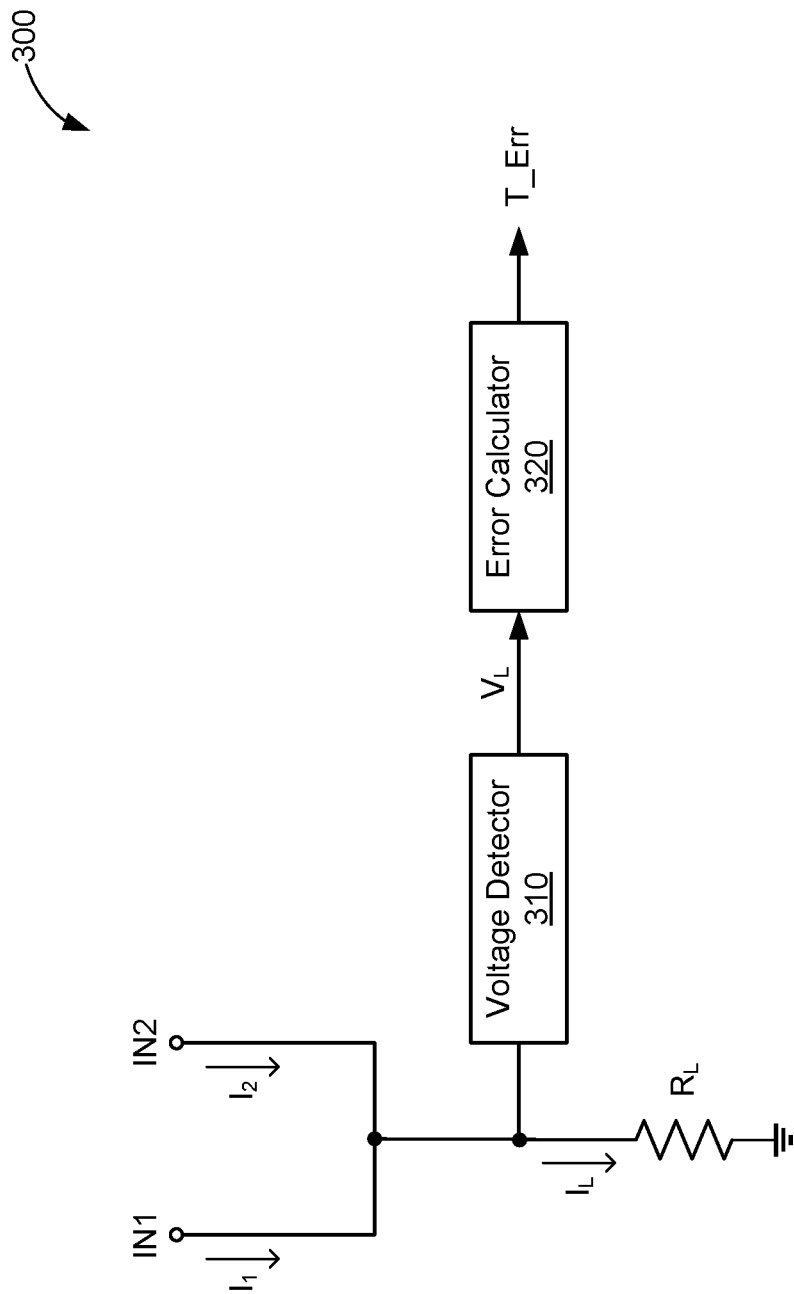
FIG. 3 shows an example error detection circuit that can be used to detect errors in a temperature sensor, in accordance with some embodiments.

FIG. 3 shows an example error detection circuit 300 that can be used to detect errors in a temperature sensor, in accordance with some embodiments. The error detection circuit 300 may be an example embodiment of the error detection circuit 250 of FIG. 2 and/or error detection circuitry 140 of FIG. 1. Thus, the error detection circuit 300 may be configured to detect errors in the temperature estimate generated by a temperature sensor (such as the temperature sensor 100 of FIG. 1 and/or temperature sensor 200 of FIG. 2) based, at least in part, on one or more bias currents $I_1$ and/or $I_2$ used to bias the temperature sensor. The error detection circuit 300 includes a set of inputs IN1 and IN2, a load ($R_L$), a voltage detector 310, and an error calculator 320.

The inputs IN1 and IN2 may be coupled to receive bias currents $I_1$ and $I_2$, respectively, from a current source. With reference for example to FIG. 2, the inputs IN1 and IN2 may be switchably coupled to the transistors M1 and M2 via the switches 201 and 202, respectively. In some embodiments, the inputs IN1 and IN2 may be concurrently coupled to the transistors M1 and M2 to receive the bias currents $I_1$ and $I_2$ at substantially the same time. In some other embodiments, the inputs IN1 and IN2 may be individually coupled to the transistors M1 and M2 to receive the bias currents $I_1$ and $I_2$ at different times. Thus, when the inputs IN1 and IN2 are concurrently coupled to the transistors M1 and M2, the load current IL may be the sum (or difference) of the bias currents $I_1$ and $I_2$ (e.g., $I_L=I_1+I_2$). When the inputs IN1 and IN2 are individually coupled to the transistors M1 and M2, the load current IL may comprise only one of the bias currents $I_1$ and $I_2$ at any given time (e.g., $I_L=I_1$ or $I_L=I_2$).

The load current $I_L$ produces a voltage across the load $R_L$ that can be measure by the voltage detector 310 (e.g., $V_L=I_L*R_L$). In some embodiments, the load $R_L$ has a predetermined impedance and is manufactured using a known process. In the example of FIG. 3, the load $R_L$ is depicted as a resistor. However, in actual implementations, various other loads may be used to produce a measurable voltage in response to the load current $I_L$. The voltage detector 310 senses the voltage ($V_L$) across the load $R_L$ and provides the voltage measurement $V_L$ to the error calculator 320. The error calculator 320 further calculates an amount of error (T_Err) in the temperature estimate of a temperature sensor based on the measured voltage $V_L$. As described above with respect to Equation 1, the voltage difference $\Delta V_{BE}$ (and thus the temperature estimate T_Est) may vary with respect to variations in the bias currents $I_1$ and/or $I_2$. It is also noted that any variations in the bias currents $I_1$ and/or $I_2$ will be reflected in the voltage measurement $V_L$.

In some embodiments, the error calculator 320 may calculate the error T_Err based on the voltage across the load attributed to the sum of the bias currents $I_1$ and $I_2$. For example, the error calculator 320 may first calculate a voltage ($V_{sum}$) associated with the sum of the bias currents $I_1$ and $I_2$:

$$V_{sum}=(I_1+I_2)R_L=I_1R_L+I_2R_L$$

In some aspects, $V_{sum}$ may be equal to $V_L$ when $I_L=I_1+I_2$. In some other aspects, $V_{sum}$ may be equal to the sum of $V_{L1}$ and $V_{L2}$ when $I_L=I_1$ or $I_2$ (e.g., where $V_{L1}=I_1*R_L$ and $V_{L2}=I_2*R_L$).

The error calculator 320 may then calculate the error T_Err attributed to the spread in the bias currents $I_1$ and $I_2$ based, at least in part, on the voltage sum $V_{sum}$:

$$T\_Err = \frac{\frac{V_{sum}}{R_L} - 2I_{nom}}{2I_{nom} * \text{percent\_spread}}$$

where $I_{nom}$ is a nominal value for each of the bias currents $I_1$ and $I_2$ (it is noted that each of the bias currents $I_1$ and $I_2$ is expected to have the same nominal value $I_{nom}$) and "percent_spread" is the percentage spread in the bias current that causes a temperature error of 1° C. (e.g., percent_spread=0.088 means an 8.8% spread in the bias current causes 1° C. of error in the temperature estimate).

As described with respect to FIG. 2, the error T_Err may be used to adjust or correct the temperature estimate It is noted that the voltage sum $V_{sum}$ represents the combined spread of the bias currents $I_1$ and $I_2$. However, there may also be mismatch between the individual bias currents $I_1$ and $I_2$ (e.g., $I_1 \neq I_2$). In some aspects, mismatch between the bias currents $I_1$ and $I_2$ may be corrected or compensated in the temperature sensor using dynamic element matching (DEM) techniques. In some other aspects, the error detection circuit 300 may be configured to measure the mismatch between the bias currents $I_1$ and $I_2$.

In some embodiments, the error calculator 320 may calculate the error T_Err based on the voltage across the load attributed to the difference of the bias currents $I_1$ and $I_2$. For example, the error calculator 320 may calculate a voltage ($V_{diff}$) associated with the difference between the bias currents $I_1$ and $I_2$:

$$V_{diff} = (I_1 - I_2)R_L = I_1 R_L - I_2 R_L$$

In some aspects, $V_{diff}$ may be equal to the difference between $V_{L1}$ and $V_{L2}$ (e.g., where $V_{L1} = I_1 * R_L$ and $V_{L2} = I_2 * R_L$). The error calculator 320 may then calculate the error T_Err attributed to the spread in the bias currents $I_1$ and $I_2$ based, at least in part, on the voltage difference $V_{diff}$ (e.g., in a similar manner as described with respect to the voltage sum $V_{sum}$).

Still further, in some embodiments, the error calculator 320 may determine the error T_Err based on a combination of the voltage sum $V_{sum}$ and the voltage difference $V_{diff}$. As described above, the voltage sum $V_{sum}$ reflects the combined spread of the bias currents $I_1$ and $I_2$ whereas the voltage difference $V_{diff}$ reflects any mismatch between the individual bias currents $I_1$ and $I_2$. Thus, each of these voltage measurements may have a different transfer function with respect to temperature. Thus, in some aspects, the error calculator 320 may calculate the error T_Err based on the sensitivity of the temperature estimate to the voltage sum $V_{sum}$ and the voltage difference $V_{diff}$:

$$T\_Err = xV_{sum} + yV_{diff}$$

where x is a scaling factor corresponding to the temperature sensitivity to the voltage sum $V_{sum}$ and y is a scaling factor corresponding to the temperature sensitivity to the voltage difference $V_{diff}$.

Figure 4:
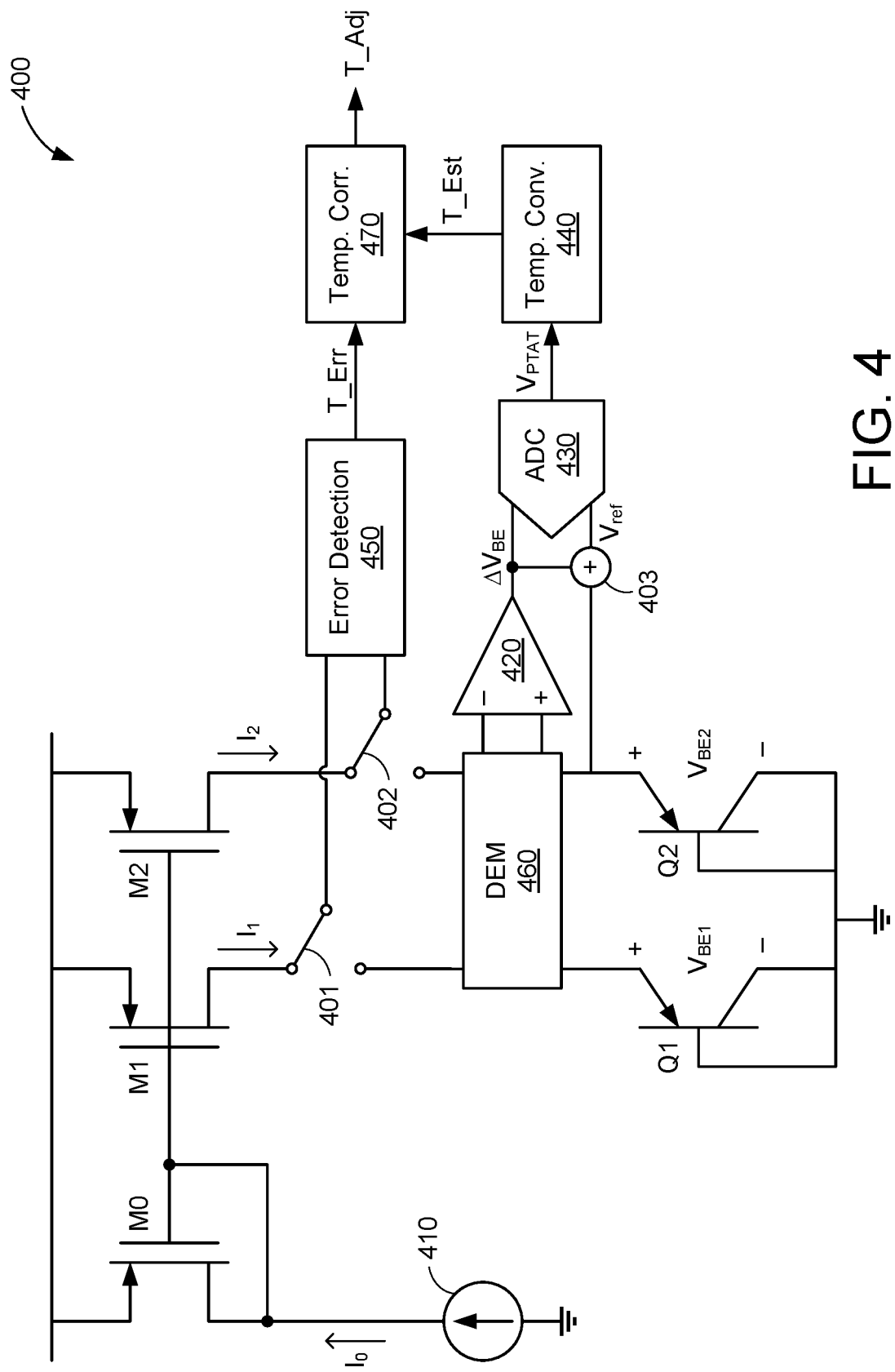
FIG. 4 is a circuit diagram of a temperature sensor with temperature correction circuitry, in accordance with some embodiments.

FIG. 4 is a circuit diagram of a temperature sensor 400 with temperature correction circuitry, in accordance with some embodiments. The temperature sensor 400 may be an example embodiment of the temperature sensor 100 of FIG. 1 and/or the temperature sensor 200 of FIG. 2. Thus, the temperature sensor 400 may be used for distributed temperature monitoring across integrated circuit devices. The temperature sensor 400 includes first transistors M0-M2, second transistors Q1 and Q2, a current source 410, an amplifier 420, an ADC 430, a temperature conversion circuit 440, an error detection circuit 250, a dynamic element matching (DEM) circuit 460, and a temperature correction circuit 470.

The current source 410 is configured to generate a temperature-independent reference current $I_0$. For example, the current source 410 may correspond to or include a bandgap voltage reference. The first transistors M0-M2 are configured to operate as a current mirror to produce a set of bias currents $I_1$ and $I_2$ that are substantially equal to the reference current $I_0$. In some embodiments, the dimensions and/or properties of the transistors M1 and M2 are configured to be substantially similar (if not identical). Thus, the magnitude of each of the bias currents $I_1$ and $I_2$ should be substantially equal to a nominal current value (such as $I_0$) when the transistors M1 and M2 are coupled to the same or equivalent loads. However, due to process variations, the bias currents $I_1$ and $I_2$ may differ from the nominal value.

The DEM circuit 460 may distribute the bias currents $I_1$ and $I_2$ to each of the second transistors Q1 and Q2 in a pseudorandom manner. More specifically, the DEM circuit 460 may switch between the bias currents $I_1$ and $I_2$ on a sample-by-sample basis to mitigate any mismatch between the bias currents $I_1$ and $I_2$. For example, at first instance of time, the DEM circuit 460 may provide the first bias current $I_1$ to transistor Q1 and the second bias current $I_2$ to transistor Q2 and, at a second instance of time, the DEM circuit 460 may provide the first bias current $I_1$ to transistor Q2 and the second bias current $I_2$ to transistor Q1. In the example of FIG. 4, the transistors Q1 and Q2 are configured to operate as diodes. In some embodiments, the dimensions and/or properties of the transistors Q1 and Q2 may have a ratio (1:N). Accordingly, the net collector current of transistor Q2 is expected to be N times the collector current of transistor Q1.

The amplifier 420 amplifies the difference between the base emitter voltages $V_{BE1}$ and $V_{BE2}$ of the transistors Q1 and Q2, respectively, and the resulting voltage difference ($\Delta V_{BE}$) is sampled by the ADC 430. More specifically, the ADC 430 may generate a digital voltage sample that is proportional to absolute temperature ($V_{PTAT}$) by comparing the voltage difference $\Delta V_{BE}$ to a reference voltage ($V_{ref}$). As described with respect to FIG. 2, a temperature-independent reference voltage $V_{ref}$ can be produced based on a combination of the voltage difference $\Delta V_{BE}$ and the base-emitter voltage ($V_{BE}$) of one of the transistors Q1 or Q2.

The temperature conversion circuit 440 may convert the digital voltage $V_{PTAT}$ to a temperature estimate (T_Est) that more closely reflects the actual temperature of the environment. For example, the temperature conversion circuit 440 may apply a scaling factor (m) to the digital voltage $V_{PTAT}$ to produce a temperature estimate T_Est within a preconfigured temperature range:

$$T\_Est = mV_{PTAT} + \text{offset}$$

In some embodiments, the error detection circuit 450 may be switchably coupled to the transistors M1 and M2 (e.g., via switches 401 and 402, respectively) to detect variations or differences in the bias currents $I_1$ and $I_2$. In some aspects, the error detection circuit 450 may be coupled to receive the bias currents $I_1$ and/or $I_2$ during a period when the temperature sensor 400 is in a sleep state (e.g., where the temperature sensor 400 is not actively generating a temperature estimate T_Est). For example, during the sleep state, the switches 401 and 402 may couple the error detection circuit 450 to the first transistors M1 and M2 while also decoupling the second transistors Q1 and Q2 from the first transistors M1 and M2.

The error detection circuit 450 may detect process variations in the bias currents $I_1$ and $I_2$. In some aspects, the error detection circuit 450 may be an example embodiment of the error detection circuit 300 of FIG. 3. Accordingly, the error detection circuit 450 may calculate an amount of error (T_Err) in the temperature estimate T_Est based on variations in one or more of the bias currents $I_1$ and/or $I_2$. In some embodiments, the error T_Err may be provided to the temperature correction circuit 470 to correct the temperature estimate T_Est in the digital domain. For example, the temperature correction circuit 470 may subtract (or add) the error T_Err from the temperature estimate T_Est to produce an adjusted temperature estimate T_Adj that more accurately reflects the actual temperature of the environment:

$$T\_Adj = T\_Est - T\_Err$$

In the example of FIG. 4, mismatch between the bias currents $I_1$ and $I_2$ is compensated through dynamic element matching (e.g., via the DEM circuit 460). However, in some other embodiments, any mismatch between the bias currents $I_1$ and $I_2$ may be corrected by adjusting the individual bias currents $I_1$ and/or $I_2$ (e.g., by adjusting the ratio of the first transistors M1 and M2 and/or adjusting the ratio of the second transistors Q1 and Q2). Such adjustments in the analog domain may further reduce the spread of the voltage difference $\Delta V_{BE}$, resulting in more accurate temperature estimates T_Est by the temperature conversion circuit.

Figure 5:
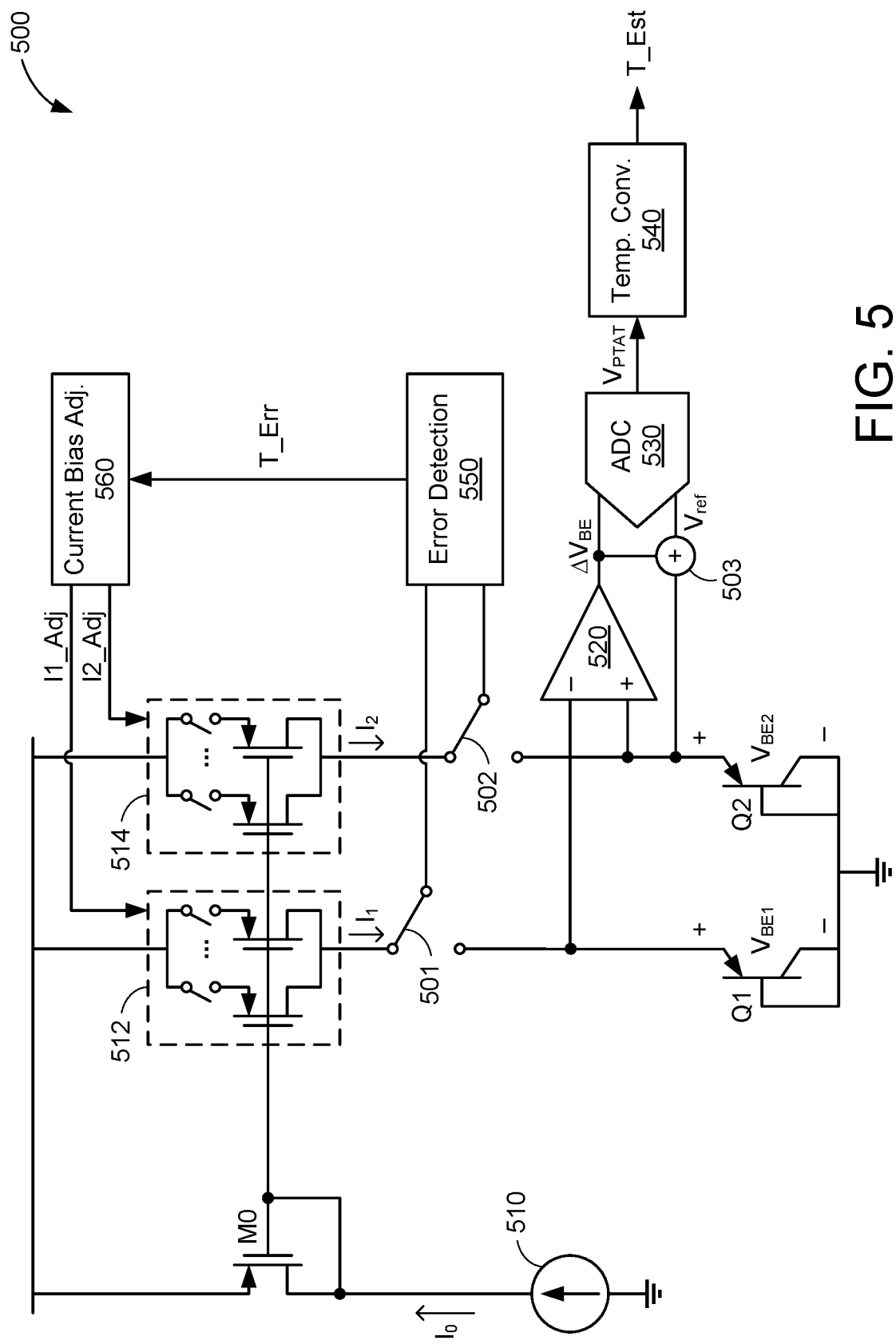
FIG. 5 is another circuit diagram of a temperature sensor with error compensation circuitry, in accordance with some embodiments.

FIG. 5 is another circuit diagram of a temperature sensor 500 with error compensation circuitry, in accordance with some embodiments. The temperature sensor 500 may be an example embodiment of the temperature sensor 100 of FIG. 1 and/or the temperature sensor 200 of FIG. 2. Thus, the temperature sensor 500 may be used for distributed temperature monitoring across integrated circuit devices. The temperature sensor 500 includes first transistors M0, second transistors Q1 and Q2, a current source 510, current mirrors 512 and 514, an amplifier 520, an ADC 530, a temperature conversion circuit 540, an error detection circuit 550, and a current bias adjustment circuit 560.

The current source 510 is configured to generate a temperature-independent reference current $I_0$. For example, the current source 510 may correspond to or include a bandgap voltage reference. The current mirrors 512 and 514 are coupled to the first transistor M0 to produce a set of bias currents $I_1$ and $I_2$, respectively, that substantially mirror the reference current $I_0$. In some embodiments, each of the current mirrors 512 and 514 may comprise one or more transistors switchably coupled (e.g., in parallel) to the first transistor M0. In the example of FIG. 5, the current mirrors 512 and 514 are shown to include a plurality of PMOS transistors. However, in actual implementations, one or more of the current mirrors 512 and/or 514 may include transistors of a different transistor type (e.g., BJT) or a different channel type (e.g., NMOS). In some embodiments, the dimensions and/or properties of the PMOS transistors are configured to be substantially similar (if not identical). Thus, the current density through each of the PMOS transistors (e.g., when coupled to the first transistor M0) should be substantially equal.

The second transistors Q1 and Q2 are configured to receive the bias currents $I_1$ and $I_2$, respectively. In the example of FIG. 5, the transistors Q1 and Q2 are configured to operate as diodes. In some embodiments, the dimensions and/or properties of the transistors Q1 and Q2 may have a ratio (1:N). Accordingly, the net collector current of transistor Q2 is expected to be N times the collector current of transistor Q1. The amplifier 520 amplifies the difference between the base emitter voltages $V_{BE1}$ and $V_{BE2}$ of the transistors Q1 and Q2, respectively, and the resulting voltage difference ($\Delta V_{BE}$) is sampled by the ADC 530. More specifically, the ADC 530 may generate a digital voltage sample that is proportional to absolute temperature ($V_{PTAT}$) by comparing the voltage difference $\Delta V_{BE}$ to a reference voltage ($V_{ref}$). The temperature conversion circuit 540 may convert the digital voltage $V_{PTAT}$ to a temperature estimate (T_Est) that more closely reflects the actual temperature of the environment (e.g., as described with respect to FIG. 4).

In some embodiments, the error detection circuit 550 may be switchably coupled to the current mirrors 512 and 514 (e.g., via switches 501 and 502, respectively) to detect variations or differences in the bias currents $I_1$ and $I_2$. In some aspects, the error detection circuit 550 may be coupled to receive the bias currents $I_1$ and/or $I_2$ during a period when the temperature sensor 500 is in a sleep state (e.g., where the temperature sensor 500 is not actively generating a temperature estimate T_Est). For example, during the sleep state, the switches 501 and 502 may couple the error detection circuit 550 to the current mirrors 512 and 514 while also decoupling the second transistors Q1 and Q2 from the current mirrors 512 and 514.

The error detection circuit 550 may detect process variations in the bias currents $I_1$ and $I_2$. In some aspects, the error detection circuit 550 may be an example embodiment of the error detection circuit 300 of FIG. 3. Accordingly, the error detection circuit 550 may calculate an amount of error (T_Err) in the temperature estimate T_Est based on variations in one or more of the bias currents $I_1$ and/or $I_2$. In some embodiments, the error T_Err may be provided to the current bias adjustment circuit 560 to adjust one or more of the bias currents $I_1$ and/or $I_2$ to compensate for process variations in the bias currents $I_1$ and/or $I_2$. For example, in some aspects, the current bias adjustment circuit 560 may determine, based on the error T_Err, an amount of mismatch between the bias currents $I_1$ and $I_2$. In some other aspects, the current bias adjustment circuit 560 may determine, based on the error T_Err, how much each of the bias currents $I_1$ and $I_2$ deviates from its nominal value. In some embodiments, the current bias adjustment circuit 560 may selectively add or remove transistors in each of the current mirrors 512 and 514 (e.g., via respective control signals I1_Adj and I2_Adj) to increase or decrease the bias currents $I_1$ and/or $I_2$.

In the example of FIG. 5, errors in the temperature estimate T_Est may be reduced by using feedback to correct or compensate for variations in the individual bias currents $I_1$ and/or $I_2$ (e.g., in the analog domain). As a result, the temperature estimate T_Est generated by the temperature conversion circuit 540 may more accurately reflect the actual temperature of the environment of the temperature sensor 500.

Figure 6:
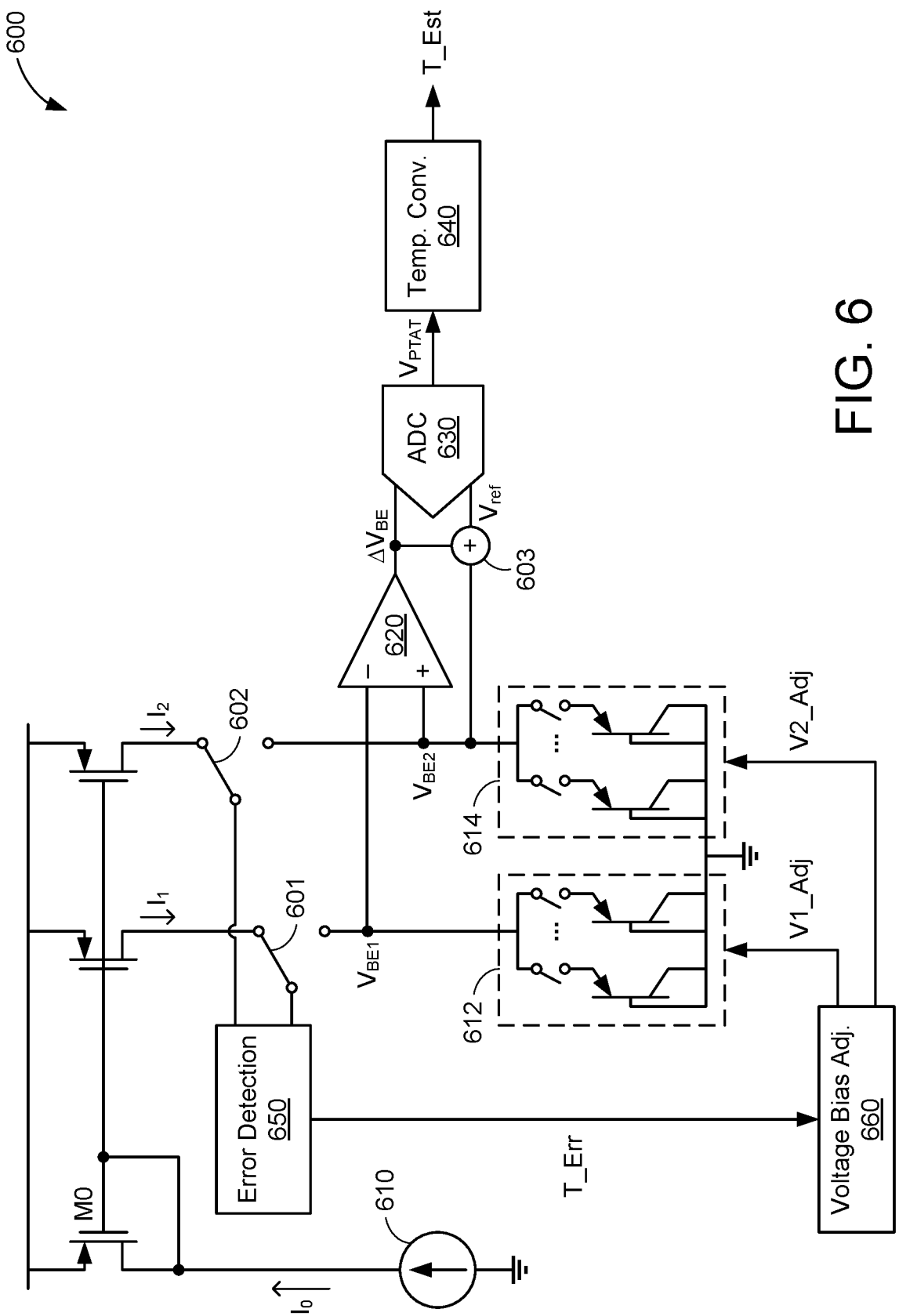
FIG. 6 is another circuit diagram of a temperature sensor with error compensation circuitry, in accordance with some embodiments.

FIG. 6 is another circuit diagram of a temperature sensor 600 with error compensation circuitry, in accordance with some embodiments. The temperature sensor 600 may be an example embodiment of the temperature sensor 100 of FIG. 1 and/or the temperature sensor 200 of FIG. 2. Thus, the temperature sensor 600 may be used for distributed temperature monitoring across integrated circuit devices. The temperature sensor 600 includes first transistors M0-M2, a current source 610, temperature-dependent loads 612 and 614, an amplifier 620, an ADC 630, a temperature conversion circuit 640, an error detection circuit 650, and a voltage bias adjustment circuit 660.

The current source 610 is configured to generate a temperature-independent reference current $I_0$. For example, the current source 610 may correspond to or include a bandgap voltage reference. The first transistors M0-M2 are configured to operate as a current mirror to produce a set of bias currents $I_1$ and $I_2$ that are substantially equal to the reference current $I_0$. In some embodiments, the dimensions and/or properties of the transistors M1 and M2 are configured to be substantially similar (if not identical). Thus, the magnitude of each of the bias currents $I_1$ and $I_2$ should be substantially equal to a nominal current value (such as $I_0$) when the transistors M1 and M2 are coupled to the same or equivalent loads. However, due to process variations, the bias currents $I_1$ and $I_2$ may differ from the nominal value.

The temperature-dependent loads 612 and 614 are configured to receive the bias currents $I_1$ and $I_2$, respectively. In some embodiments, each of the temperature-dependent loads 612 and 614 may comprise one or more transistors switchably coupled (e.g., in parallel) to a respective one of the transistors M1 and M2. In the example of FIG. 6, the temperature-dependent loads 612 and 614 are shown to include a plurality of PNP transistors. However, in actual implementations, one or more of the temperature-dependent loads 612 and/or 614 may include transistors of a different transistor type (e.g., MOSFET) or a different BJT type (e.g., NPN). In some embodiments, the dimensions and/or properties of the PNP transistors are configured to be substantially similar (if not identical). Furthermore, the temperature-dependent loads 612 and 614 may be configured to have a ratio (1:N). For example, the second temperature-dependent load 614 may have N times the number of PNP transistors of the first temperature-dependent load 612. Accordingly, the net collector current of the second temperature-dependent load 614 is expected to be N times the net collector current of the first temperature-dependent load 612.

The amplifier 620 amplifies the difference between the base emitter voltages $V_{BE1}$ and $V_{BE2}$ of the temperature-dependent loads 612 and 614, respectively, and the resulting voltage difference ($\Delta V_{BE}$) is sampled by the ADC 630. More specifically, the ADC 630 may generate a digital voltage sample that is proportional to absolute temperature ($V_{PTAT}$) by comparing the voltage difference $\Delta V_{BE}$ to a reference voltage ($V_{ref}$). The temperature conversion circuit 640 may convert the digital voltage $V_{PTAT}$ to a temperature estimate (T_Est) that more closely reflects the actual temperature of the environment (e.g., as described with respect to FIG. 4).

In some embodiments, the error detection circuit 650 may be switchably coupled to the transistors M1 and M2 (e.g., via switches 601 and 602, respectively) to detect variations or differences in the bias currents $I_1$ and $I_2$. In some aspects, the error detection circuit 650 may be coupled to receive the bias currents $I_1$ and/or $I_2$ during a period when the temperature sensor 600 is in a sleep state (e.g., where the temperature sensor 600 is not actively generating a temperature estimate T_Est). For example, during the sleep state, the switches 601 and 602 may couple the error detection circuit 650 to the first transistors M1 and M2 while also decoupling the temperature-dependent loads 612 and 614 from the first transistors M1 and M2.

The error detection circuit 650 may detect process variations in the bias currents $I_1$ and $I_2$ to a nominal current value. In some aspects, the error detection circuit 650 may be an example embodiment of the error detection circuit 300 of FIG. 3. Accordingly, the error detection circuit 650 may calculate an amount of error (T_Err) in the temperature estimate T_Est based on variations in one or more of the bias currents $I_1$ and/or $I_2$. In some embodiments, the error T_Err may be provided to the voltage bias adjustment circuit 660 to adjust one or more of the voltage biases $V_{BE1}$ and/or $V_{BE2}$ to compensate for process variations in the bias currents $I_1$ and/or $I_2$. For example, in some aspects, the voltage bias adjustment circuit 660 may determine, based on the error T_Err, an amount of mismatch between the bias currents $I_1$ and $I_2$. In some other aspects, the voltage bias adjustment circuit 660 may determine, based on the error T_Err, how much each of the bias currents $I_1$ and $I_2$ deviates from its nominal value. In some embodiments, the voltage bias adjustment circuit 660 may selectively add or remove transistors in each of the temperature-dependent loads 612 and 614 (e.g., via respective control signals V1_Adj and V2_Adj) to increase or decrease the voltage biases $V_{BE1}$ and/or $V_{BE2}$.

In the example of FIG. 6, errors in the temperature estimate T_Est may be reduced by using feedback to correct or compensate for variations in the individual bias currents $I_1$ and/or $I_2$ (e.g., in the analog domain). As a result, the temperature estimate T_Est generated by the temperature conversion circuit 640 may more accurately reflect the actual temperature of the environment of the temperature sensor 600.

Figure 7:
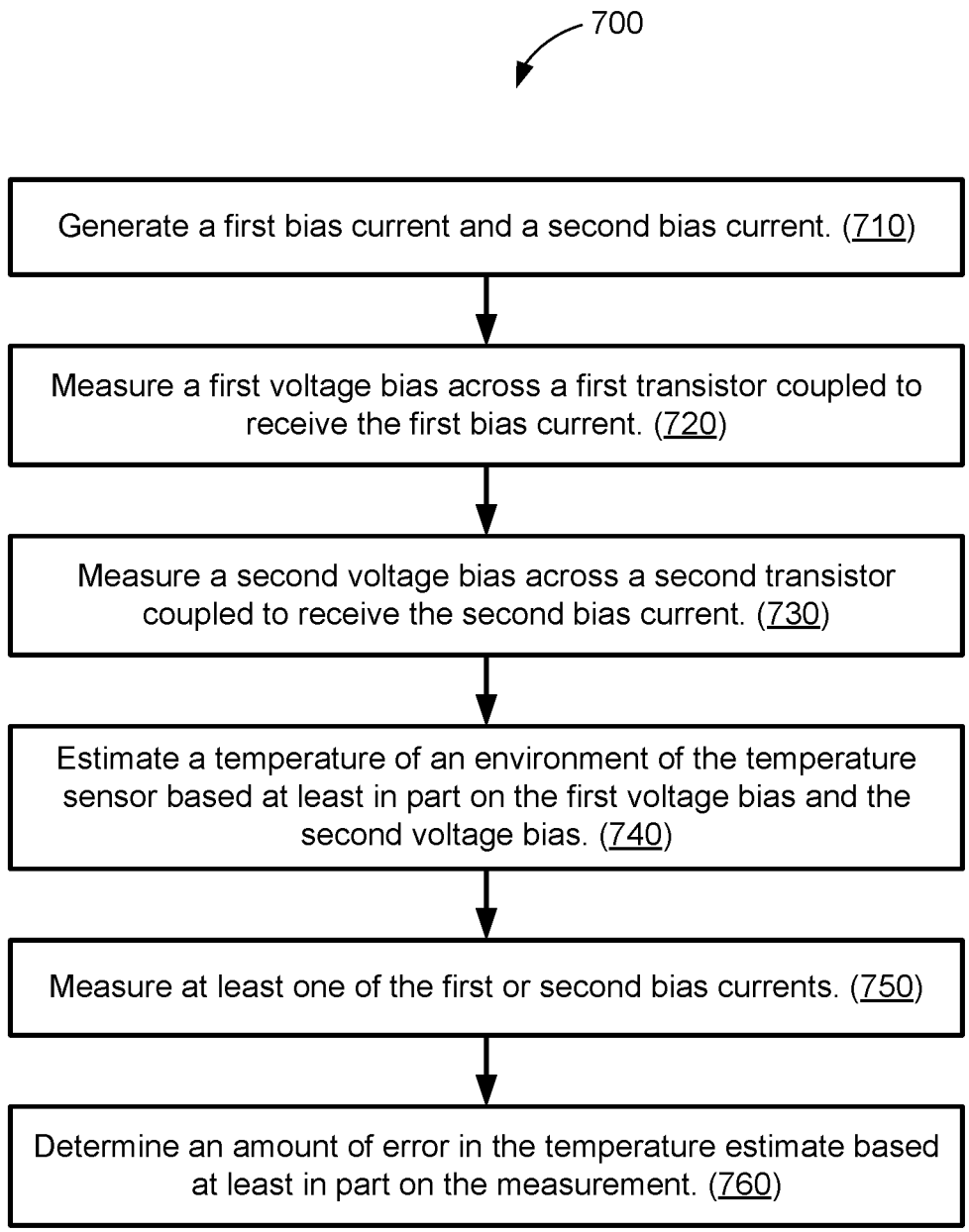
FIG. 7 is an illustrative flow chart depicting an example operation of a temperature sensor, in accordance with some embodiments.

FIG. 7 is an illustrative flow chart depicting an example operation 700 of a temperature sensor, in accordance with some embodiments. With reference for example to FIG. 2, the example operation 700 may be performed by the temperature sensor 200 to monitor a temperature of an integrated circuit device.

The temperature sensor 200 generates a first bias current and a second bias current (710). For example, the current source 210 may generate a temperature-independent reference current $I_0$. The transistors M0-M2 may further produce a set of bias currents $I_1$ and $I_2$ that are substantially equal to the reference current $I_0$. In some embodiments, the dimensions and/or properties of the transistors M1 and M2 are configured to be substantially similar (if not identical). Thus, the magnitude of each of the bias currents $I_1$ and $I_2$ should be substantially equal to a nominal current value (such as $I_0$) when the transistors M1 and M2 are coupled to the same or equivalent loads.

The temperature sensor 200 measures a first voltage bias across a first transistor coupled to receive the first bias current (720). For example, the transistor Q1 may be configured to receive the first bias current $I_1$. In some embodiments, the transistor Q1 may function as a diode (e.g., based on the P-N junction between its base and emitter terminals). The amplifier 220 may sense the base-emitter voltage ($V_{BE1}$) of the transistor Q1, which can be expressed as a function of the first bias current $I_1$:

$$V_{BE1} = \frac{kT}{q}\ln\frac{I_1}{I_S}$$

The temperature sensor 200 also measures a second voltage bias across a second transistor coupled to receive the second bias current (730). For example, the transistor Q2 may be configured to receive the second bias current $I_2$. In some embodiments, the transistor Q2 may function as a diode (e.g., based on the P-N junction between its base and emitter terminals). The amplifier 220 may also sense the base-emitter voltage ($V_{BE2}$) of the transistor Q2, which can be expressed as a function of the second bias current $I_2$:

$$V_{BE2} = \frac{kT}{q}\ln\frac{I_2}{I_S}$$

The temperature sensor 200 may estimate a temperature of its environment based at least in part on the first voltage bias and the second voltage bias (740). For example, the dimensions and/or properties of the transistors Q1 and Q2 may have a ratio (1:N). Accordingly, the net collector current of transistor Q2 is expected to be N times the collector current of transistor Q1. The amplifier 220 amplifies the difference between the base emitter voltages $V_{BE1}$ and $V_{BE2}$ of the transistors Q1 and Q2, respectively, and the resulting voltage difference ($\Delta V_{BE}$) is sampled by the ADC 230. More specifically, the ADC 230 may generate a digital voltage sample that is proportional to absolute temperature ($V_{PTAT}$) by comparing the voltage difference $\Delta V_{BE}$ to a reference voltage ($V_{ref}$). The temperature conversion circuit 240 may convert the digital voltage $V_{PTAT}$ to a temperature estimate (T_Est) that more closely reflects the actual temperature of the environment (e.g., as described with respect to FIG. 4)

The temperature sensor 200 may further measure at least one of the first or second bias currents (750). For example, the error detection circuit 250 may be switchably coupled to the transistors M1 and M2 (e.g., via switches 201 and 202, respectively) to measure the bias currents $I_1$ and $I_2$. In some aspects, the error detection circuit 250 may be coupled to receive the bias currents $I_1$ and/or $I_2$ during a period when the temperature sensor 200 is in a sleep state (e.g., where the temperature sensor 200 is not actively generating a temperature estimate T_Est). For example, during the sleep state, the switches 201 and 202 may couple the error detection circuit 250 to the first transistors M1 and M2 while also decoupling the second transistors Q1 and Q2 from the first transistors M1 and M2

The temperature sensor 200 may then determine an amount of error in the temperature estimate based at least in part on the measurement (760). For example, the error detection circuit 250 may compare the bias currents $I_1$ and $I_2$ to a nominal current value to detect variations in one or more of the bias currents $I_1$ and/or $I_2$. With reference for example to Equation 1, it is noted that the voltage difference $\Delta V_{BE}$ may vary with respect to variations in the bias currents $I_1$ and/or $I_2$. It is also noted that any variations in the voltage difference $\Delta V_{BE}$ may be directly converted to errors in the temperature estimate T_Est (e.g., by the temperature conversion circuit 240). Accordingly, the error detection circuit 250 may calculate an amount of error (T_Err) in the temperature estimate T_Est based on variations in one or more of the bias currents $I_1$ and/or $I_2$ (e.g., as described with respect to FIG. 3).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A temperature sensor, comprising:
    a current source configured to produce a first bias current and a second bias current;
    a plurality of diodes coupled to the current source, the plurality of diodes including at least a first diode to receive the first bias current and a second diode to receive the second bias current;
    temperature estimation circuitry to measure a first voltage bias across the first diode associated with the first bias current and to measure a second voltage bias across the second diode associated with the second bias current, the temperature estimation circuitry being configured to estimate a temperature of an environment of the temperature sensor based at least in part on the first voltage bias and the second voltage bias; and
    error detection circuitry switchably coupled to the current source, the error detection circuitry being configured to determine an amount of error in the temperature estimate based at least in part on measurements of at least one of the first or second bias currents.

2. The temperature sensor of claim 1, wherein the error detection circuitry is further configured to measure the at least one of the first or second bias currents when the temperature estimation circuitry is in a sleep state.

3. The temperature sensor of claim 1, wherein the amount of error in the temperature estimate is based at least in part on variations in at least one of the first or second bias currents.

4. The temperature sensor of claim 1, further comprising:
    error compensation circuitry configured to adjust the temperature estimate based at least in part on the amount of error.

5. The temperature sensor of claim 4, wherein the error compensation circuitry is to adjust the temperature estimate by adjusting at least one of the first bias current or the second bias current produced by the current source.

6. The temperatures sensor of claim 4, wherein the error compensation circuitry is to adjust the temperature estimate by adjusting at least one of the first voltage bias or the second voltage bias of the plurality of diodes.

7. The temperature sensor of claim 1, wherein the error detection circuitry comprises:
a resistor;
switching circuitry configured to route each of the first and second bias currents to the resistor; and
error calculation circuitry configured to determine the amount of error in the temperature estimate based at least in part on a voltage of the resistor resulting from the first and second bias currents.

8. The temperature sensor of claim 7, wherein the switching circuitry is to route the first and second bias currents, concurrently, to the resistor.

9. The temperature sensor of claim 7, wherein the switching circuitry is to route each of the first and second bias currents to the resistor at different times, and wherein the error calculation circuitry is to measure a first voltage across the resistor in response to the first bias current and a second voltage across the resistor in response to the second bias current.

10. The temperature sensor of claim 9, wherein the amount of error in the temperature estimate is based on a difference between the first voltage and the second voltage.

11. The temperature sensor of claim 9, wherein the amount of error in the temperature estimate is based on a sum of the first voltage and the second voltage.

12. A method of operating a temperature sensor, comprising:
generating a first bias current and a second bias current;
measuring a first voltage bias across a first diode coupled to receive the first bias current;
measuring a second voltage bias across a second diode coupled to receive the second bias current;
estimating a temperature of an environment of the temperature sensor based at least in part on the first voltage bias and the second voltage bias;
measuring one or more of the first or second bias currents; and
determining an amount of error in the temperature estimate based at least in part on the one or more of the measured first or second bias currents.

13. The method of claim 12, wherein the one or more of the first or second bias currents are measured when the temperature sensor is not estimating the temperature of the environment.

14. The method of claim 12, wherein the amount of error in the temperature estimate is based at least in part on variations in the one or more of the first or second bias currents.

15. The method of claim 12, wherein measuring the one or more of the first or second bias currents comprises:
routing each of the first and second bias currents to a resistor; and
measuring a voltage of the resistor resulting from the first and second bias currents, wherein the amount of error in the temperature estimate is based at least in part on the voltage of the resistor.

16. The method of claim 15, wherein the routing comprises routing the first and second bias currents, concurrently, to the resistor.

17. The method of claim 15, wherein the routing comprises routing each of the first and second bias currents to the resistor at different times, and wherein measuring the voltage of the resistor comprises:
measuring a first voltage across the resistor in response to the first bias current; and
measuring a second voltage across the resistor in response to the second bias current.

18. The method of claim 12, further comprising:
adjusting the temperature estimate based at least in part on the amount of error.

19. The method of claim 18, wherein the adjusting comprises:
adjusting at least one of the first bias current or the second bias current.

20. The method of claim 18, wherein the adjusting comprises:
adjusting at least one of the first voltage bias or the second voltage bias.

* * * * *